United States Patent Office 3,046,089
Patented July 24, 1962

3,046,089
PROCESS OF TREATING URANIUM HEXAFLUORIDE AND PLUTONIUM HEXAFLUORIDE MIXTURES WITH SULFUR TETRAFLUORIDE TO SEPARATE SAME
Martin J. Steindler, Park Forest, Ill., assignor to the United States of America as represented by the United States Atomic Energy Commission
No Drawing. Filed Feb. 8, 1961, Ser. No. 87,971
5 Claims. (Cl. 23—14.5)

This invention deals with the separation, by fluorination, of uranium from plutonium and also from fission products as they are present together in neutron-irradiated fuel materials. The process is applicable, for example, to natural or enriched uranium fuel materials and also to plutonium-containing fuel as it is used for breeder reactors; however, it is suitable for any other plutonium-uranium material. The process is particularly valuable for the processing of oxidic fuel materials which have been irradiated, for instance, in the Dresden nuclear power reactor.

Nuclear fuel for the above-mentioned reactors is either used in the form of shaped elements, which are mostly clad with a corrosion-resistant metal, such as stainless steel and zirconium-base metals, or else the fuel is irradiated in the form of pellets or other regular or irregular particles. After neutron-bombardment, it is necessary to regenerate the fuel by removing the fission products, and it also is desirable to separate and recover the plutonium formed.

It is an object of this invention to provide a process for the separation of plutonium from uranium by which a uranium-free plutonium compound is obtained.

It is also an object of this invention to provide a process for the separation of uranium from plutonium which does not require elaborate equipment and which is comparatively inexpensive.

This invention is based on the finding that sulfur tetrafluoride has a reducing action on plutonium hexafluoride, but does not react with uranium hexafluoride.

The process of this invention comprises fluorinating the plutonium-containing uranium material with fluorine gas at elevated temperature whereby uranium hexafluoride, plutonium hexafluoride and some fission product fluorides are formed; removing the uranium and plutonium hexafluorides and the volatile fission product fluorides from the non-volatile fission product fluorides and nonfluorinated fission products by distillation; condensing the uranium and plutonium hexafluorides; adding an excess of sulfur tetrafluoride to the hexafluorides at elevated temperature whereby a mixture of uranium hexafluoride, plutonium tetrafluoride, sulfur hexafluoride and nonreacted sulfur tetrafluoride is obtained; and evaporating the sulfur hexafluoride, sulfur tetrafluoride and uranium hexafluoride away from the solid plutonium tetrafluoride. The treatment of a uranium hexafluoride-plutonium hexafluoride mixture is also claimed as invention.

In the case of fuel elements that are covered or "clad" with a corrosion-resistant alloy, the latter is preferably removed prior to subjecting the elements to the process of this invention. Decladding can be carried out by mechanical means, but it is preferred to dissolve the metal chemically. In the case of a zirconium-base alloy, a mixture of hydrogen chloride and hydrogen fluoride has been found best suitable for this purpose, while in the case of stainless steel chlorine gas is preferred.

The fuel material or declad fuel elements are fluorinated with fluorine gas at a temperature of from 400 to 500° C., a step known to those skilled in the art. In this step uranium hexafluoride and plutonium hexafluoride are formed, and some of the fission products are also converted to the fluorides. The hexafluorides are volatile at the fluorination temperature and distill off; most of the fission products remain in a residue. The hexafluorides are then condensed at a temperature of from −60 to −100° C., but preferably at about −80° C.; Dry Ice, solid $CO_2$, is suitable to provide this temperature.

Thereafter the condensed plutonium and uranium hexafluorides are contacted, according to this invention, with sulfur tetrafluoride, and preferably with an excess thereof. A temperature of between 50 and 120° C. is suitable for this reaction, the range of from 70 to 100° C. being preferred. In this phase of the process, as has been stated before, sulfur tetrafluoride reduces the plutonium hexafluoride to the tetrafluoride and thereby is converted to sulfur hexafluoride. After completion of the reaction, the reaction container is brought to −60 to −100° C., preferably to −80° C., a temperature at which the uranium and plutonium fluorides of the reaction mixture are solid, while the excess sulfur tetrafluoride and the sulfur hexafluoride formed are gaseous and distill off. They can be condensed for reuse in a liquid-nitrogen-cooled condenser.

Thereafter, the reaction container is allowed to warm up to room temperature and at the same time it is connected with another condenser held at the above temperature of between −60 and −100° C. At this temperature the uranium hexafluoride and any nonreacted plutonium hexafluoride distill off; they are solidified again in the condenser. The plutonium tetrafluoride formed during the reaction is solid at room temperature and remains in the reaction container, together with a very minor fraction of nonfluorinated fission products or fission product fluorides that did not distill off at the temperature of the fluorination step.

The plutonium tetrafluoride, which usually is free from uranium, may then be reacted with steam whereby plutonium oxide is formed, or else it can be reduced directly to the metal with alkali or alkaline earth metal. This plutonium oxide can be reused and be incorporated in uranium for further neutron bombardment. Likewise, the uranium hexafluoride can be converted to uranium oxide, after the fission product fluorides have been fractionated off, by reduction and hydrolysis.

While all distillation processes can be carried out at atmospheric pressure, a reduced pressure was found preferable.

In the following, an example is given to illustrate the process of this invention.

*Example*

Into a container of known weight that was immersed in liquid nitrogen, uranium hexafluoride was introduced and the quantity condensed therein was determined to be 0.9239 gram. Thereafter plutonium hexafluoride was introduced into the same container at the same temperature, and the condensed quantity was also determined by weighing; 0.1866 gram of plutonium hexafluoride had been condensed. Thereafter sulfur tetrafluoride was condensed in the same way; its quantity was 0.445 gram. The container was then closed, heated to a temperature of about 70° C. and maintained there for four hours and ten minutes. The container was then brought to a temperature of −80° C. by immersion in Dry Ice and the pressure was reduced; it was connected with a condenser immersed in liquid nitrogen. The excess sulfur tetrafluoride and the sulfur hexafluoride formed were evaporated into the condenser.

The container was then connected with another, second condenser, which was immersed in Dry Ice; the reaction container was removed from the Dry Ice, allowed to warm up to room temperature and at the same time connected with a vacuum. The uranium hexafluoride and any nonreacted plutonium hexafluoride were thereby vaporized and condensed again in the second condenser; the container was weighed. From the weight loss of the container plus content, the quantity of reduced plutonium tetrafluoride was calculated. It was found that 98.8% of the plutonium hexafluoride had been retained in the container as the solid tetrafluoride.

The uranium hexafluoride and small quantity of plutonium hexafluoride in the second condenser were distilled with water for the purpose of hydrolysis and analyzed for their plutonium and uranium contents. This analysis showed that 66.7% of the uranium had been recovered in the form of uranium hexafluoride. The remaining 33% represented an experimental loss.

It will be understood that this invention is not to be limited to the details given herein but that it may be modified within the scope of the appended claims.

What is claimed is:

1. A process of separating uranium hexafluoride from plutonium hexafluoride, comprising mixing these fluorides with sulfur tetrafluoride at a temperature of between 50 and 120° C. whereby the plutonium hexafluoride is reduced to the tetrafluoride while the uranium hexafluoride remains unreacted; cooling the fluoride mixture to about −60 to −100° C. and distilling off excess sulfur tetrafluoride and the sulfur hexafluoride formed; allowing the remaining fluoride mixture to warm to room temperature whereby the uranium hexafluoride distills away from the solid plutonium tetrafluoride; and condensing the uranium hexafluoride.

2. The process of claim 1 wherein sulfur tetrafluoride is added in an amount excessive of that stoichiometrically required for the reduction of the plutonium hexafluoride.

3. The process of claim 1 wherein the reaction with sulfur tetrafluoride is carried out at a temperature between 70 and 100° C. and the condensation of the hexafluorides at a temperature of about −80° C.

4. The process of claim 1 wherein both fluoride distillations are carried out at reduced pressure.

5. A process of recovering plutonium from a neutron-bombarded uranium oxide mass containing said plutonium and fission products, comprising contacting said oxide mass with fluorine gas at between 400 and 500° C. whereby uranium hexafluoride, plutonium hexafluoride and some fission product fluorides are formed and the uranium hexafluoride, plutonium hexafluoride and a minor fraction of the fission product fluorides distill off; condensing the volatilized uranium and plutonium fluorides; adding sulfur tetrafluoride to the condensed fluorides at a temperature of between 50 and 120° C. whereby the bulk of the plutonium hexafluoride is reduced to plutonium tetrafluoride and sulfur hexafluoride is formed, while uranium hexafluoride remains unreacted; cooling the reaction mass to about −80° C. and reducing the pressure whereby any remaining sulfur hexafluoride and sulfur tetrafluoride are evaporated away from solid plutonium tetrafluoride, plutonium hexafluoride and uranium hexafluoride; allowing the solid fluorides to warm to room temperature while maintaining a reduced pressure whereby uranium hexafluoride and any plutonium hexafluoride distill away from solid plutonium tetrafluoride; and condensing the uranium hexafluoride.

References Cited in the file of this patent

UNITED STATES PATENTS

| | | |
|---|---|---|
| 2,822,239 | Brown | Feb. 4, 1958 |
| 2,859,097 | Davidson et al. | Nov. 4, 1958 |
| 2,904,394 | Smith | Sept. 15, 1959 |

OTHER REFERENCES

AEC document, ANL 6145, pp. 93–109, January–March 1960. (Copy in POSL.)

UNITED STATES PATENT OFFICE
Certificate

Patent No. 3,046,089

Patented July 24, 1962

Martin J. Steindler

Application having been made jointly by Martin J. Steindler, the inventor named in the patent above identified; Roland A. Anderson for the United States of America, as represented by the United States Atomic Energy Commission, the assignee; and Jack Fischer of 5324 Meadow Lane, Lisle, County of Du Page, Illinois; for the issuance of a certificate under the provisions of Title 35, Section 256 of the United States Code, adding the name of the said Jack Fischer to the patent as a joint inventor, and a showing and proof of facts satisfying the requirements of the said section having been submitted, it is this 4th day of June 1963, certified that the name of the said Jack Fischer is hereby added to the said patent as a joint inventor with the said Martin J. Steindler.

[SEAL]

EDWIN L. REYNOLDS,
*First Assistant Commissioner of Patents.*